:tag:(12) United States Patent (10) Patent No.: US 7,632,891 B2
Fink et al. (45) Date of Patent: Dec. 15, 2009

(54) GRAFTING OF NITROXYL TERMINATED OLIGOMERS OR POLYMERS ONTO THERMOPLASTIC POLYMERS

(75) Inventors: Jochen Fink, Nussloch (DE); Michael Roth, Lautertal (DE); Rudolf Pfaendner, Rimbach (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 751 days.

(21) Appl. No.: 10/518,873

(22) PCT Filed: Jun. 12, 2003

(86) PCT No.: PCT/EP03/06165

§ 371 (c)(1),
(2), (4) Date: Dec. 20, 2004

(87) PCT Pub. No.: WO04/000890

PCT Pub. Date: Dec. 31, 2003

(65) Prior Publication Data

US 2005/0215720 A1 Sep. 29, 2005

(30) Foreign Application Priority Data

Jun. 20, 2002 (EP) .................................. 02405514

(51) Int. Cl.
*C08L 53/02* (2006.01)
*C08L 51/02* (2006.01)
(52) U.S. Cl. ..................... 525/98; 525/203; 525/205; 525/221; 525/222; 525/230; 525/231

(58) Field of Classification Search ............... 525/70, 525/191, 73, 98, 203, 221, 222, 230, 231
See application file for complete search history.

(56) References Cited

U.S. PATENT DOCUMENTS

| 5,919,861 | A * | 7/1999 | Kazmaier et al. ............. 525/26 |
| 5,945,492 | A * | 8/1999 | Robert ..................... 526/219.2 |
| 6,335,401 | B1 * | 1/2002 | Bertin et al. ................ 525/242 |
| 6,444,754 | B1 * | 9/2002 | Chin et al. ................ 525/92 B |
| 2004/0077788 | A1 * | 4/2004 | Saldivar Guerra et al. ..... 525/88 |

FOREIGN PATENT DOCUMENTS

DE 4328004 2/1995
EP 0315280 3/1985

OTHER PUBLICATIONS

Y. Miwa et al., Macromolecules, (1999), vol. 32, pp. 8234-8236.

* cited by examiner

*Primary Examiner*—Jeffrey C Mullis
(74) *Attorney, Agent, or Firm*—Tyler A. Stevenson

(57) ABSTRACT

The instant invention relates to a process for the preparation of grafted polymers wherein in a first step A) a oligomer or polymer is prepared by controlled radical polymerization in the presence of a stable free nitroxyl radical or a nitroxylether to obtain a nitroxyl terminated oligomer or polymer and in a second step B) the nitroxyl terminated oligomer or polymer is mixed and reacted with a thermoplastic or elastomeric polymer or copolymer in its molten state at a temperature at which cleavage of the nitroxyl-polymer/oligomer bond occurs, whereby the nitroxyl terminated oligomer or polymer is grafted onto the thermoplastic or elastomeric polymer. A further subject of the present invention is a grafted polymer prepared by said process.

15 Claims, No Drawings

GRAFTING OF NITROXYL TERMINATED OLIGOMERS OR POLYMERS ONTO THERMOPLASTIC POLYMERS

The instant invention relates to a process for the preparation of grafted (co)polymers wherein in a first step A) an oligomer or polymer is prepared by controlled free radical polymerization in the presence of a stable free nitroxyl radical or a nitroxylether to obtain a nitroxyl terminated oligomer or polymer and in a second step B) the nitroxyl terminated oligomer or polymer is mixed and reacted with a thermoplastic or elastomeric polymer or copolymer at a temperature at which cleavage of the nitroxyl-polymer/oligomer bond occurs, whereby the nitroxyl terminated oligomer or polymer is chemically bonded to the thermoplastic or elastomeric polymer. A further aspect of the present invention is a grafted/comb (co)polymer prepared by said process.

Increasing activities have been directed towards chemical modifications of existing polymers in order to obtain functional and/or engineered new materials. Chemical modifications of existing polymers are important for at least two reasons: 1. They can be an inexpensive and rapid way of obtaining new polymers without having to search for new monomers; 2. they may be the only way to synthesize polymers with the intended new characteristics.

An important chemical modification is the free radical grafting of functionalized or reactive monomers, which involves reaction of a polymer with a vinyl-group containing monomer or mixture of monomers capable of forming grafts onto the polymer backbone. By selecting monomers, length of the grafts, number of grafts adjustment of polymer properties is feasible. For example, if the grafts are long enough or the quantity of grafts is high, the modified polymer has properties of a true graft copolymer, which will be different from those of the original polymer substrate and combines usually properties of the parent polymers. When the grafts are short with less than, for example five moieties or the quantity of the grafts is low, most of the physical and or mechanical properties of the modified polymer substrate will be retained. Nevertheless, these changes can e.g. result in altered adhesion and surface properties or modified compatibilization behavior with other substrates. However, technically it is very difficult to tailor the different parameters of monomer structure, number of grafts and molecular weight of grafted chains.

The advantages of free radical-grafting are further gained with the use of batch mixers or screw extruders as chemical reactors, which allow the free radical-grafting reaction to occur without solvents. This is for example described by G. H. Hu et al., in "Reactive Modifiers for Polymers", first edition, Blackie Academic & Professional an Imprint of Chapman & Hall, London 1997, chapter 1, pages 1-97.

These free radical-grafting reactions are usually performed in the presence of a free radical source such as a peroxide and a reactive monomer, such as for example acrylic acid. However the use of free radical sources such as peroxides may cause undesired side reactions leading to problems during synthesis and processing (gel formation, crosslinking, molecular weight reduction) or during use. Typically the long-term thermal stability is reduced and/or the polymer cannot anymore be used in outdoor applications or in applications at elevated temperatures.

A further disadvantage of monomeric grafting processes is that the number of accessible monomers in a melt process is limited due to volatility, thermal stability and side reactions e.g. homopolymerization takes place in parallel to the grafting reaction resulting in incompatible polymer mixtures without chemical bonding.

Furthermore it is very difficult or even impossible to obtain long chain grafted structures from monomers via classical radical processes, as the lifetime of the growing radical chain is limited due to necessary high temperatures of a melt process.

The instant invention avoids the disadvantages of the prior art, by preparing in a first step a nitroxyl terminated oligomer or polymer, the molecular weight of which can be adjusted for example by the concentration of the nitroxyl compound, the monomer used, the reaction time (which is related to monomer conversion) and temperature. The nitroxyl terminated oligomer or polymer acts in a second step as a macroinitiator and the polymer radical derived from the macroinitiator is grafted onto the elastomeric or thermoplastic polymer or copolymer.

Another aspect of the invention is the manufacture of exact graft copolymers with a clearly defined structure, e.g. predefined and similar branches. In addition, the number of branches can be simply controlled by the amount of nitroxyl-terminated oligomers/polymers added to the thermoplastic or elastomeric polymer. Furthermore monomers or monomer combinations are accessible as graft structures and also block copolymer structures, which are not accessible in a classical radical polymerization process.

Processes for the preparation of nitroxyl terminated oligomers or polymers are known in the art.

For example U.S. Pat. No. 4,581,429 to Solomon et al., issued Apr. 8, 1986, discloses a free radical polymerization process which controls the growth of polymer chains to produce short chain or oligomeric homopolymers and copolymers. The process employs an initiator having the formula (in part) R'R"N—O—X, where X is a free radical species capable of polymerizing unsaturated monomers and the radical R'R"N—O. is terminating the growing oligomer/polymer.

U.S. Pat. No. 5,322,912 to Georges et al. issued Jun. 21, 1994 discloses a polymerization process using a free radical initiator, a polymerizable monomer compound and a stable free radical agent of the basic structure R'R"N—O. for the synthesis of homopolymers and block copolymers which are terminated by the nitroxyl radical.

More recently further nitroxyl radicals and nitroxyl ethers have been described.

WO 98/13392 for example describes open chain alkoxyamine compounds, which have a symmetrical substitution pattern and are derived from NO gas or from nitroso compounds.

WO 96/24620 describes a polymerization process in which very specific stable free radical agents are used, such as for example

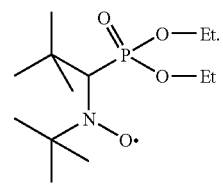

WO 98/30601 discloses specific nitroxyls based on imidazolidinons.

WO 98/44008 discloses specific nitroxyls based on morpholinones, piperazinones and piperazindiones.

These prior art nitroxyl radicals and nitroxyl ethers are all suitable for the instant process.

The instant invention relates to a process for the preparation of a grafted thermoplastic or elastomeric polymer or copolymer, which process comprises in a first step A) the preparation of a nitroxyl terminated oligomer or polymer by controlled free radical polymerization of an ethylenically unsaturated monomer
  a1) in the presence of a nitroxyl ether R'R"N—O—X wherein X is selected such, that cleavage of the O—X bond occurs and a radical X. is formed capable of initiating polymerization; or
  a2) in the presence of a nitroxyl radical R'R"N—O. and a free radical initiator capable of initiating polymerization; and in a second step B) heating, mixing and reacting the nitroxyl terminated oligomer or polymer of step A) together with a thermoplastic or elastomeric polymer or copolymer at a temperature of between 120° C. and 300° C.

For example the second step B) comprises heating, mixing and reacting the nitroxyl terminated oligomer or polymer of step A) together with a thermoplastic or elastomeric polymer or copolymer in the molten state at a temperature of between 150° C. and 300° C.

Suitable thermoplastic or elastomeric polymers and copolymers are subsequently mentioned.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either $\pi$- or $\sigma$-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly($\alpha$-methylstyrene).

6. Aromatic homopolymers and copolymers derived from vinyl aromatic monomers including styrene, $\alpha$-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Preferably the thermoplastic or elastomeric polymer or copolymer is selected from the group consisting of a polyolefin and its copolymers, polystyrene and its block or graft copolymers and polymers or copolymers derived from 1,3-dienes.

More preferably the thermoplastic or elastomeric polymer or copolymer is selected from the group consisting of low density polyethylene (LDPE, LLDPE), high density polyethylene (HDPE), polypropylene (PP), polystyrene (PS), styrene-block copolymers (SI(S), SI, SB(S), ABS, ASA), ethylene-propylene-diene modified rubber (EPDM, EPM) and ethylene propylene rubber (EPR), polybutylene (PB), polyisobutylene (PIB), poly-4-methylpentene-1 (PMP).

In a specific embodiment of the invention the thermoplastic or elastomeric polymer or copolymer contains unsaturated bonds.

Typically X is selected from the group consisting of

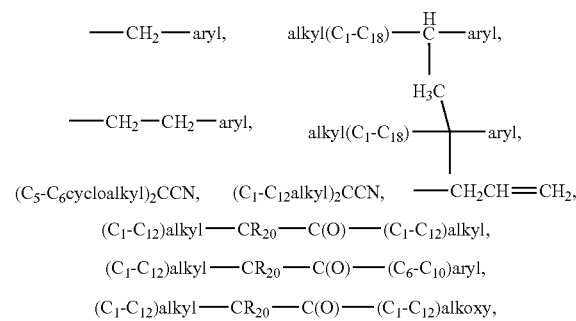

-continued (C₁-C₁₂)alkyl—CR₂₀—C(O)—phenoxy, (C₁-C₁₂)alkyl—CR₂₀—C(O)—N—di(C₁-C₁₂)alkyl, (C₁-C₁₂)alkyl—CR₂₀—CO—NH(C₁-C₁₂)alkyl, (C₁-C₁₂)alkyl—CR₂₀—CO—NH₂, —CH₂CH=CH—CH₃, —CH₂—C(CH₃)=CH₂, —CH₂—CH=CH—phenyl,

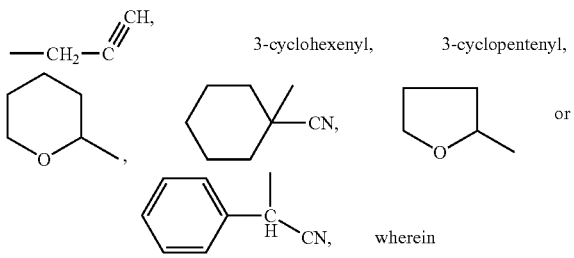

wherein $R_{20}$ is hydrogen or $C_1$-$C_{12}$alkyl;

the alkyl groups are unsubstituted or substituted with one or more —OH, —COOH or —C(O)R₂₀ groups; and the aryl groups are phenyl or naphthyl which are unsubstituted or substituted with $C_1$-$C_{12}$alkyl, halogen, $C_1$-$C_{12}$alkoxy, $C_1$-$C_{12}$alkylcarbonyl, glycidyloxy, OH, —COOH or —COO($C_1$-$C_{12}$)alkyl.

The nitroxylethers and nitroxyl radicals suitable for the invention are principally known from U.S. Pat. No. 4,581,429 or EP-A-621 878. Particularly useful are the open chain compounds described in WO 98/13392, WO 99/03894 and WO 00/07981, the piperidine derivatives described in WO 99/67298, GB 2335190 and GB 2 361 235 or the heterocyclic compounds described in GB 2342649 and WO 96/24620. Recently further nitroxyl radicals and nitroxyl ethers have been described in WO 02/48205, WO02/48109 and WO 02/100831.

Also suitable are the compounds described by Hawker et al, Chem. Commun., 2001, 823-824

Some compounds are commercially available or can be prepared according to the aforementioned documents.

In a specific embodiment of the invention the nitroxylether or the nitroxyl radical contains a structural element of formula (Ia) or (Ib)

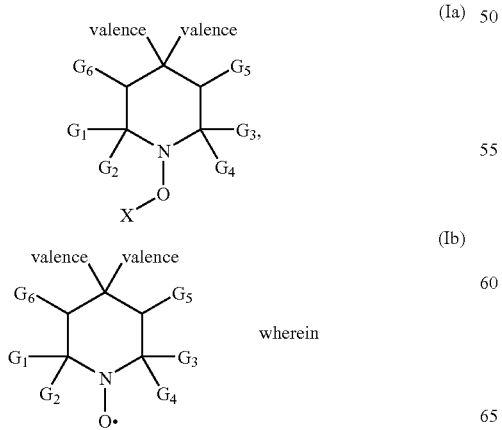

wherein $G_1, G_2, G_3$ and $G_4$ are independently alkyl of 1 to 4 carbon atoms, or $G_1$ and $G_2$ together and $G_3$ and $G_4$ together, or $G_1$ and $G_2$ together or $G_3$ and $G_4$ together are pentamethylene;

$G_5$ and $G_6$ are independently hydrogen or $C_1$-$C_4$ alkyl;

m is 1, 2, 3 or 4

$G_1, G_2, G_3, G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group;

$G_5, G_6$ independently are H, $C_1$-$C_{18}$alkyl, phenyl, naphthyl or a group COOC$_1$-C$_{18}$alkyl.

In one embodiment of the invention components a1) and a2) are of formula A, A', B, B' or O, O'

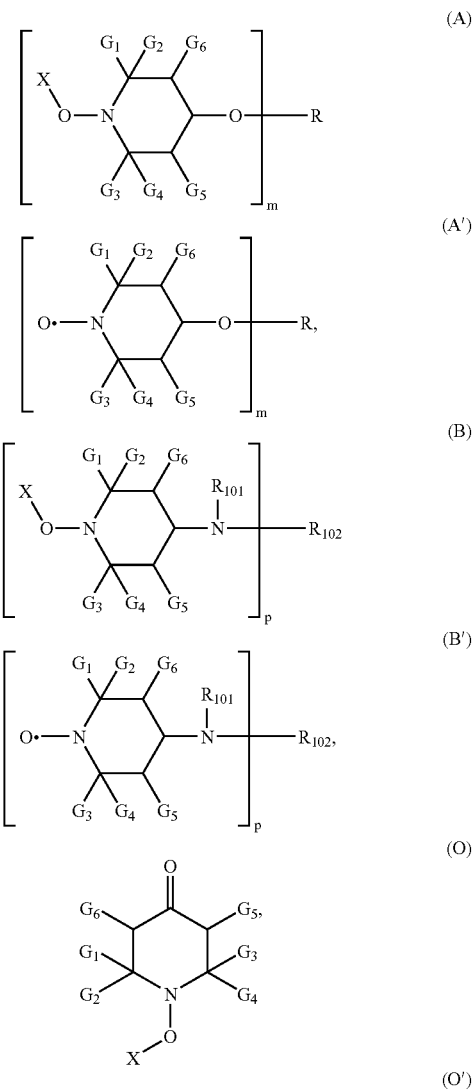

R, if m is 1, is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —$COOZ_{12}$ groups, in which $Z_{12}$ is H, $C_1$-$C_{20}$alkyl, $C_3$-$C_{12}$alkenyl, $C_5$-$C_7$cycloalkyl, phenyl or benzyl; or R is a monovalent radical of a carbamic acid or phosphorus-containing acid or a monovalent silyl radical;

R, if m is 2, is $C_2$-$C_{12}$alkylene, $C_4$-$C_{12}$alkenylene, xylylene, a divalent radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms, where each dicarboxylic acid may be substituted in the aliphatic, cycloaliphatic or aromatic moiety by one or two —$COOZ_{12}$ groups; or R is a divalent radical of a phosphorus-containing acid or a divalent silyl radical;

R, if m is 3, is a trivalent radical of an aliphatic, cycloaliphatic or aromatic tricarboxylic acid, which may be substituted in the aliphatic, cycloaliphatic or aromatic moiety by —$COOZ_{12}$, of an aromatic tricarbamic acid or of a phosphorus-containing acid, or is a trivalent silyl radical, R, if m is 4, is a tetravalent radical of an aliphatic, cycloaliphatic or aromatic tetracarboxylic acid;

p is 1, 2 or 3, $R_{101}$ is $C_1$-$C_{12}$alkyl, $C_5$-$C_7$cycloalkyl, $C_7$-$C_9$phenylalkyl, $C_2$-$C_{18}$alkanoyl, $C_3$-$C_5$alkenoyl or benzoyl;

when p is 1, $R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$—Z or of the formula —CO—Z— or —CONH—Z wherein Z is hydrogen, methyl or phenyl; or when p is 2, $R_{102}$ is $C_2$-$C_{12}$alkylene, $C_6$-$C_{12}$-arylene, xylylene, a —$CH_2CH(OH)CH_2$—O—B—O—$CH_2CH(OH)CH_2$— group, wherein B is $C_2$-$C_{10}$alkylene, $C_5$-$C_{15}$arylene or $C_6$-$C_{12}$cycloalkylene; or, provided that $R_{101}$ is not alkanoyl, alkenoyl or benzoyl, $R_{102}$ can also be a divalent acyl radical of an aliphatic, cycloaliphatic or aromatic dicarboxylic acid or dicarbamic acid, or can be the group —CO—; or $R_{101}$ and $R_{102}$ together when p is 1 can be the cyclic acyl radical of an aliphatic or aromatic 1,2- or 1,3-dicarboxylic acid; or $R_{102}$ is a group

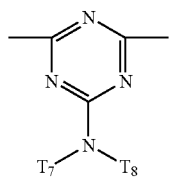

where $T_7$ and $T_8$ are independently hydrogen, alkyl of 1 to 18 carbon atoms, or $T_7$ and $T_8$ together are alkylene of 4 to 6 carbon atoms or 3-oxapentamethylene;

when p is 3, $R_{102}$ is 2,4,6-triazinyl; and

X is as defined above.

Preferably component a1) and a2) are of formula A, A', B, B' or O, O'

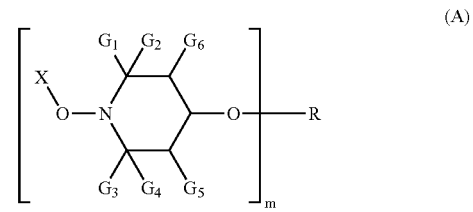

(A)

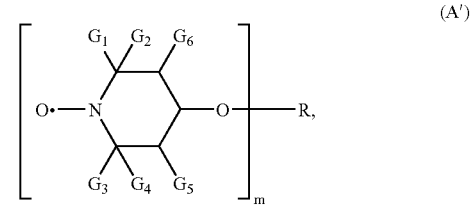

(A')

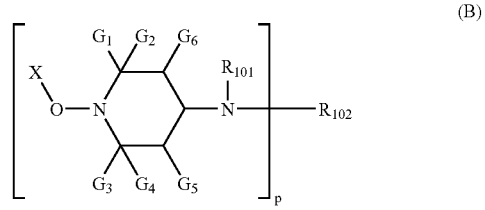

(B)

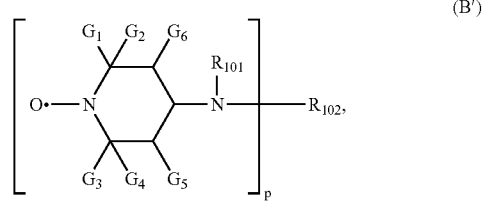

(B')

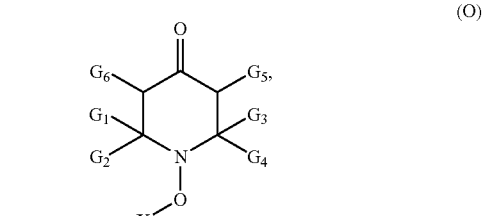

(O)

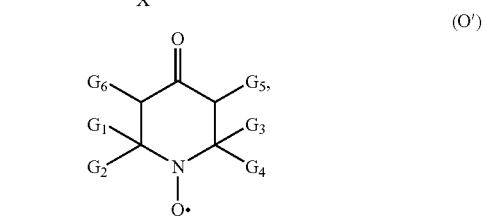

(O')

wherein m is 1,

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2$CH(OH)—Z or of the formula —CO—Z or —CONH—Z wherein Z is hydrogen, methyl or phenyl;

$G_6$ is hydrogen and $G_5$ is hydrogen or $C_1$-$C_4$alkyl, $G_1$, $G_2$, $G_3$ and $G_4$ are methyl; or $G_1$ and $G_3$ are methyl and $G_2$ and $G_4$ are ethyl or propyl or $G_1$ and $G_2$ are methyl and $G_3$ and $G_4$ are ethyl or propyl; and X is selected from the group consisting of —$CH_2$-phenyl, $CH_3$CH-phenyl, $(CH_3)_2$C-phenyl, $(C_5$-$C_6$cycloalkyl$)_2$CCN, $(CH_3)_2$CCN, —$CH_2$CH=$CH_2$, $CH_3$CH—CH=$CH_2$ ($C_1$-$C_4$alkyl)$CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl, ($C_1$-$C_4$)alkyl-$CR_{20}$—C(O)—$NH_2$, wherein $R_{20}$ is hydrogen or ($C_1$-$C_4$)alkyl.

In a particularly preferred process $G_2$ and $G_4$ are ethyl, $G_1$ and $G_3$ are methyl, $G_6$ is hydrogen and $G_5$ is methyl.

The alkyl radicals in the various substituents may be linear or branched. Examples of alkyl containing 1 to 20 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 3 to 18 carbon atoms is a linear or branched radical as for example propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl oder n-4-octadecenyl.

Preferred is alkenyl with 3 bis 12, particularly preferred with 3 to 6 carbon atoms.

$C_2$-$C_{18}$alkyl interrupted by at least one O atom is for example —$CH_2$—$CH_2$—O—$CH_2$—$CH_3$, —$CH_2$—$CH_2$—O—$CH_3$— or —$CH_2$—$CH_2$—O—$CH_2$—$CH_2$—$CH_2$—O—$CH_2$—$CH_3$—. It is preferably derived from polyethlene glycol. A general description is —(($CH_2$)$_a$—O)$_b$—H/$CH_3$, wherein a is a number from 1 to 6 and b is a number from 2 to 10.

$C_3$-$C_{12}$cycloalkyl is typically, cyclopropyl, cyclopentyl, methylcyclopentyl, dimethylcyclopentyl, cyclohexyl, methylcyclohexyl or trimethylcyclohexyl.

$C_6$-$C_{10}$ aryl is for example phenyl or naphthyl, but also comprised are $C_1$-$C_4$alkyl substituted phenyl, $C_1$-$C_4$alkoxy substituted phenyl, hydroxy, halogen or nitro substituted phenyl.

Examples for alkyl substituted phenyl are ethylbenzene, toluene, xylene and its isomers, mesitylene or isopropylbenzene. Halogen substituted phenyl is for example dichlorobenzene or bromotoluene. Examples for $C_6$-$C_{12}$arylene can be derived from the above.

Alkoxy substituents are typically methoxy, ethoxy, propoxy or butoxy and their corresponding isomers.

$C_7$-$C_9$phenylalkyl is benzyl, phenylethyl or phenylpropyl.

When R is a monovalent radical of a carboxylic acid, R is, for example, an acetic acid, caproic acid, stearic acid, acrylic acid, methacrylic acid, benzoic acid or β-(3,5-di-tert-butyl-4-hydroxy-phenyl)-propionic acid radical.

When R is a monovalent silyl radical, $Z_{12}$ is, for example, a radical of formula —($C_jH_{2j}$)—Si(Z')$_2$Z" wherein j is an integer from the range 2 to 5 and Z' and Z" are each independently of the other $C_1$-$C_4$alkyl or $C_1$-$C_4$alkoxy.

When R is a bivalent radical of a dicarboxylic acid, R is, for example, a malonic acid, succinic acid, glutaric acid, adipic acid, suberic acid, sebacic acid, maleic acid, itaconic acid, phthalic acid, dibutylmalonic acid, dibenzylmalonic acid, butyl-(3,5-di-tert-butyl-4-hydroxybenzyl)-malonic acid or bicycloheptenedicarboxylic acid radical.

When R is a trivalent radical of a tricarboxylic acid, R is, for example, a trimellitic acid, citric acid or nitrilotriacetic acid radical.

When R is a tetravalent radical of a tetracarboxylic acid, R is, for example, the tetravalent radical of butane-1,2,3,4-tetracarboxylic acid or of pyromellitic acid.

When R is a bivalent radical of a dicarbamic acid, R is, for example, a hexamethylene-dicarbamic acid or 2,4-toluylene-dicarbamic acid radical.

$C_1$-$C_{18}$alkanoyl is for example, formyl, propionyl, butyryl, octanoyl, dodecanoyl but preferably acetyl and $C_3$-$C_5$alkenoyl is in particular acryloyl.

Particularly suitable nitroxylethers and nitroxyl radicals are those of formulae

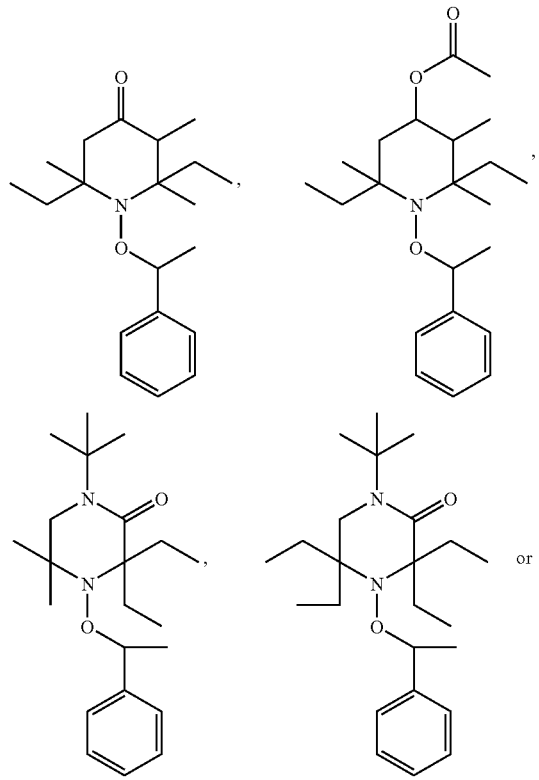

-continued
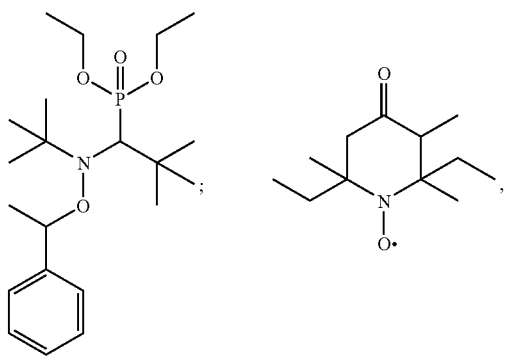
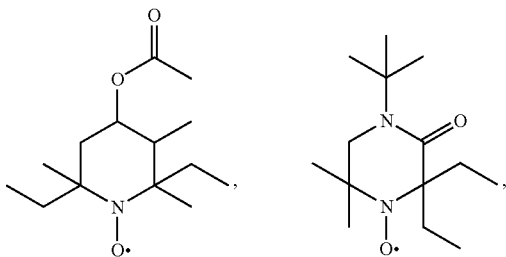
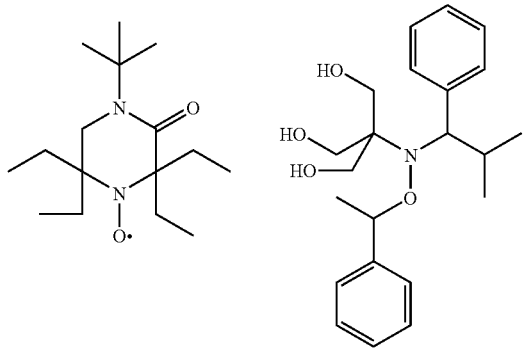
Also suitable are the following compounds:
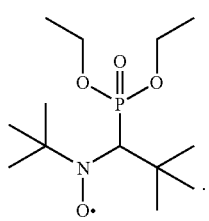
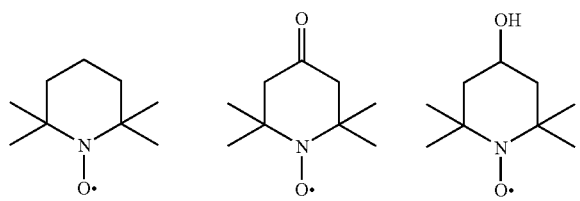
-continued
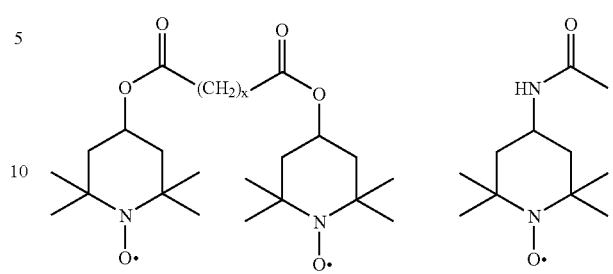
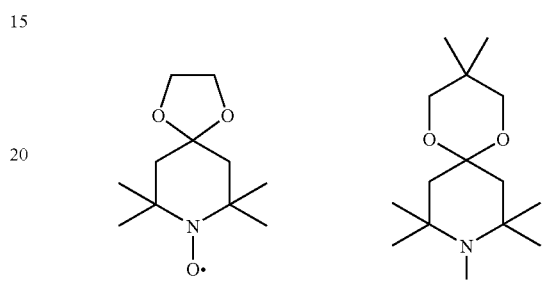
Most preferred are following compounds
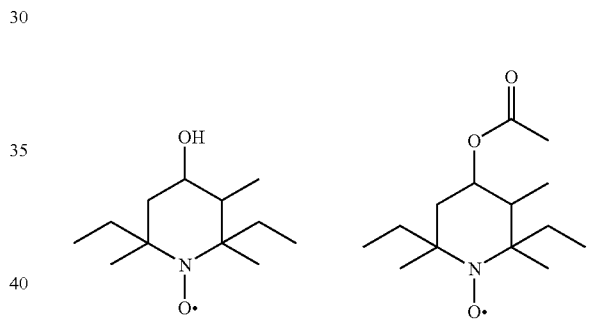
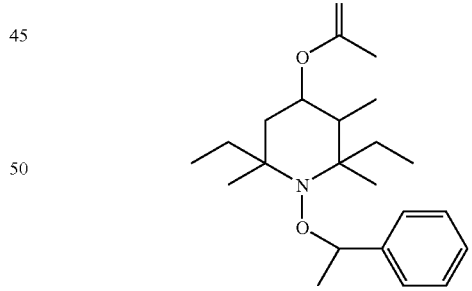
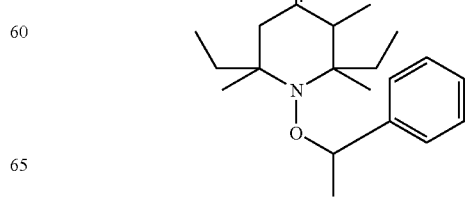

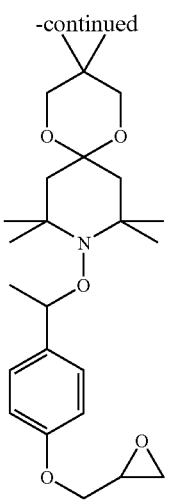

The free radical initiator of component a2) is preferably a bis-azo compound, a peroxide, a perester or a hydroperoxide.

Specific preferred radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis(t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α,α'-bis(t-butylperoxy isopropyl)benzene, 3,5-bis(t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

Azo initiators and peroxides are most preferred.

Preferably the nitroxylether of component a1) or the nitroxyl radical of component a2) is present in an amount of from 0.001 mol-% to 20 mol-%, more preferably of from 0.01 mol-% to 10 mol-% and most preferably of from 0.1 mol-% to 5 mol-%, based on the monomer or monomer mixture.

When monomer mixtures are used mol-% is calculated on an average molecular weight.

The free radical initiator is preferably present in an amount of from 0.001 mol-% to 20 mol-%, more preferably of from 0.01 mol-% to 10 mol-% and most preferably of from 0.1 mol-% to 5 mol-%, based on the monomer or monomer mixture.

The molar ratio of free radical initiator to stable free nitroxyl radical is preferably from 20:1 to 1:2, more preferably from 10:1 to 1:2.

Preferably the ethylenically unsaturated monomer or oligomer is selected from the group consisting of styrene, substituted styrene, conjugated dienes, vinyl acetate, vinylpyrrolidone, vinylimidazole, maleic anhydride, (alkyl)acrylic acidanhydrides, (alkyl)acrylic acid salts, (alkyl)acrylic esters, (meth)acrylonitriles, (alkyl)acrylamides, vinyl halides or vinylidene halides.

Preferably the ethylenically unsaturated monomer is a compound of formula $CH_2=C(R_a)-(C=Z)-R_b$, wherein $R_a$ is hydrogen or $C_1-C_4$alkyl, $R_b$ is $NH_2$, $O^-(Me^+)$, glycidyl, unsubstituted $C_1-C_{18}$alkoxy, $C_2-C_{100}$alkoxy interrupted by at least one N and/or O atom, or hydroxy-substituted $C_1-C_{18}$alkoxy, unsubstituted $C_1-C_{18}$alkylamino, di($C_1-C_{18}$alkyl)amino, hydroxy-substituted $C_1-C_{18}$alkylamino or hydroxy-substituted di($C_1-C_{18}$alkyl)amino, $-O-CH_2-CH_2-N(CH_3)_2$ or $-O-CH_2-CH_2-N^+H(CH_3)_2An^-$;

$An^-$ is an anion of a monovalent organic or inorganic acid;

Me is a monovalent metal atom or the ammonium ion.

Z is oxygen or sulfur.

Examples of acids from which the anion $An^-$ is derived are $C_1-C_{12}$carboxylic acids, organic sulfonic acids such as $CF_3SO_3H$ or $CH_3SO_3H$, mineralic acids such as HCl, HBr or HI, oxo acids such as $HClO_4$ or complex acids such as $HPF_6$ or $HBF_4$.

Examples for $R_a$ as $C_2-C_{100}$alkoxy interrupted by at least one O atom are of formula

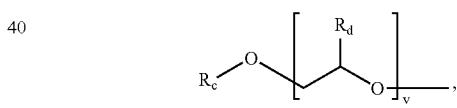

wherein $R_c$ is $C_1-C_{25}$alkyl, phenyl or phenyl substituted by $C_1-C_{18}$alkyl, $R_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

Further examples of suitable acrylate or methacrylate monomers are given below.

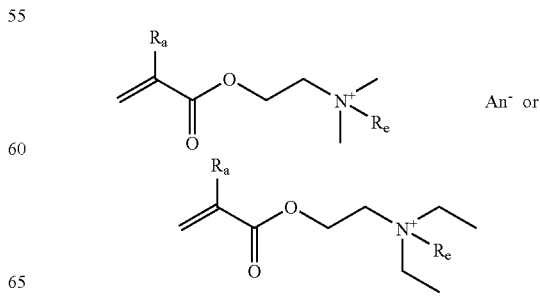

An⁻, wherein An⁻ and $R_a$ have the meaning as defined above and $R_e$ is methyl or benzyl. An⁻ is preferably Cl⁻, Br⁻ or ⁻O₃S—CH₃.

Further acrylate monomers are

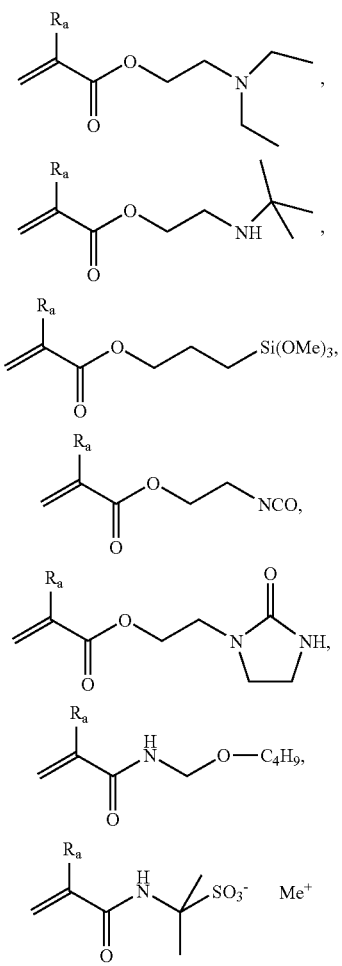

Examples for suitable monomers other than acrylates are

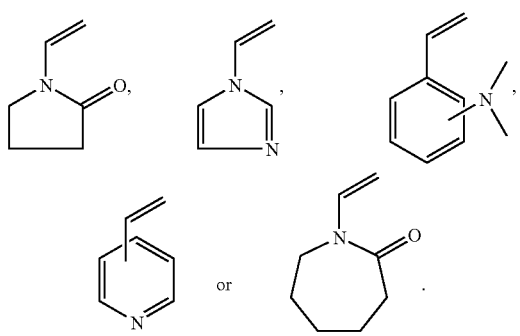

Preferably $R_a$ is hydrogen or methyl, $R_b$ is NH$_2$, gycidyl, unsubstituted or with hydroxy substituted $C_1$-$C_4$alkoxy, unsubstituted $C_1$-$C_4$alkylamino, di($C_1$-$C_4$alkyl)amino, hydroxy-substituted $C_1$-$C_4$alkylamino or hydroxy-substituted di($C_1$-$C_4$alkyl)amino; and Z is oxygen.

More preferred the ethylenically unsaturated monomer is an acrylic acid ester, acrylamide, acrylnitrile, methacrylic acid ester, methacrylamide, methacrylonitrile, maleic acid anhydride or styrene.

Acrylic acid esters and methacrylic acid esters are typically $C_1$-$C_{18}$alkyl esters.

Step A) of the instant process can also be carried out with a mixture of monomers, resulting in a nitroxyl terminated random copolymer. It is, however, also possible to carry out step A) in a consecutive way with different monomers, resulting in a block copolymer. The resulting macroinitiator can therefore be a homopolymer, a random copolymer containing two or more different monomers or a block copolymer, which may be a diblock, a triblock or a multiblock copolymer. The second monomer can also be added when still the first monomer is present in order to form tapered structures.

Random Copolymers are for example poly(styrene-co-acrylonitrile).

Block copolymers are, for example, block copolymers of polystyrene and polyacrylate (e.g., poly(styrene-co-acrylate) or poly(styrene-co-acrylate-co-styrene).

The scission of the O—C bond can be effected by ultrasonic treatment, heating or exposure to electromagnetic radiation, ranging from γ to microwaves.

The scission of the O—X bond is preferably effected by heating and takes place at a temperature of between 50° C. and 180° C., more preferably from 80° C. to 150° C.

The reaction temperature for step A) is typically between 50° C. and 180° C., more preferably between 80° C. and 150° C. Controlled polymerization is usually carried out under normal pressure. It is, however, possible for example when polymerization is carried out in the presence of water or in the presence of volatile monomers that a pressure from 1 bar to 20 bar is applied.

The reaction time for step A) can vary from several minutes to some hours, depending on the desired degree of monomer to polymer conversion, the monomer itself, reaction temperature and the desired molecular weight. Typical are 30 minutes to 24 hours, in particular 1 hour to 12 hours.

The nitroxyl terminated oligomer or polymer of step A) can be isolated and purified according to standard procedures of polymer chemistry. Preferably not reacted monomers are removed by precipitation of the polymer in an inert medium, by evaporation, by degassing or extraction, so that the macroinitiator is essentially free of monomer when step B) is applied. The drying temperature should be below 100° C. to avoid O—R bond cleavage. At ambient temperature the macroinitiator can be stored for a long time without loosing its activity.

The process step A) may be carried out in the presence of an organic solvent or in the presence of water or in mixtures of organic solvents and water. Additional cosolvents or surfactants, such as glycols or ammonium salts of fatty acids, may be present. Other suitable cosolvents are described hereinafter.

If organic solvents are used, suitable solvents or mixtures of solvents are typically pure alkanes (hexane, heptane, octane, isooctane), cycloalkanes (decaline), aromatic hydrocarbons (benzene, toluene, xylene, tert-butylbenzene), halogenated hydrocarbons (chlorobenzene, dichlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, anisol, ethylene glycol dimethyl ether), or mixtures thereof.

The aqueous polymerization reactions can be supplemented with a water-miscible or hydrophilic cosolvent to help ensure that the reaction mixture remains a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until after all polymerization reactions have been completed. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic liquids are selected as the aqueous reaction media, the water to cosolvent weight ratio is typically in the range of about 100:0 to about 10:90.

Emulsion polymerizations are a matter of particular interest. The polymers are essentially insoluble in the aqueous phase and form finely distributed droplets therein. The addition of dispersing agents such as for example sodium dodecylsulfate is in many cases necessary to achieve such stable droplets and micelles. Examples of dispersing agents are for example given in "Ullmann Enzyklopädie der technischen Chemie, Bd.10, 4. Auflage, Verlag Chemie, Weinheim (1975), page 449".

Several variations are known in the prior art, for example emulsifier free emulsion polymerization, mini emulsion polymerization and micro emulsion polymerization. These variations are characterized by changes of kind and amount of the emulsifier and initiator system leading to different polymer products, especially with regard to molecular weight, polymer particle size and their distributions.

For example the aqueous phase is from 25 to 95% preferably from 40 to 80% and more preferred from 45 to 75% by weight, based on the total mixture.

Optionally other water miscible solvents may be present usually less than 10% by weight based on the water content. Exemplary cosolvents may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof.

Preferred are water, water alcohol mixtures, water ethylene glycol or propylene glycol mixtures, water acetone, water tetrahydrofurane, or water dimethylformamide mixtures.

Preferably the solids content of the resulting polymer dispersion is between 15-60% by weight.

Emulsion polymerization is particularly suitable to built up graft polymers with uniform graft arm lengths and even new graft polymers.

The average particle diameter of the dispersed polymer particles is preferably from 25 nm to 1000 nm, more preferably 200 nm to 700 nm. Particle size may for example be measured by a high speed centrifuge or by photon correlation spectroscopy. The particle size distribution may be monomodal or bimodal.

The process of emulsion polymerization per se is known and for example described in WO 99/00426 or in WO 00/50480. It may be carried out as a batch process or in a continuous or semi continuous process.

Suitable surfactants or surface active compounds which may be added are known in the art. The amounts typically used range from 0.01% by weight to 10% by weight, based on the monomer or monomers.

Suitable surface active compounds are protective colloids such as polyvinylalcohols starch, cellulose derivatives or copolymers containing vinylpyrrolidone. Further examples are given in "Houben-Weyl, Methoden der Organischen Chemie, Band XIV/1, Makromolekulare Stoffe, G. Thieme Verlag Stuttgart 1961, 411-420".

Typical surfactants useful in the present invention are of nonionic, cationic or anionic type.

Examples for anionic surfactants are alkali and ammonium salts of $C_{12}$-$C_{18}$alkylsulfonic acid, dialkyl esters of succinic acid or sulfuric acid halfesters of ethoxylated alkanoles. These compounds are known for example from U.S. Pat. No. 4,269,749 and largely items of commerce, such as under the trade name Dowfax® 2A1 (Dow Chemical Company).

Nonionic surfactants are for example aliphatic or araliphatic compounds such as ethoxylated phenols (mon, di, tri) with an ethoxylation degree of 3 to 50 and alkyl groups in the range from $C_4$-$C_9$, ethoxylated long chain alcohols or polyethyleneoxide/polypropyleneoxide block copolymers.

The emulsion polymerization may be carried out as seed free process or according to a seed-latex process which seed latex may also be prepared in situ. Such processes are known and for example described in WO 02/024761, EP-A-614 922 or in EP-A-567 812.

The (co)polymers of step A) may have a number average molecular weight from 1 000 to 100 000 Dalton, preferably from 1000 to 50 000 Dalton and, more preferably, from 1000 to 20 000 Dalton. The number average molecular weight may be determined by size exclusion chromatography (SEC), matrix assisted laser desorption/ionization mass spectrometry (MALDI-MS) or, if the initiator carries a group which can be easily distinguished from the monomer(s), by NMR spectroscopy or other conventional methods.

The polymers or copolymers of step A) have preferably a polydispersity of from 1.0 to 2.0, more preferably of from 1.1 to 1.8, and most preferably from 1.1 to 1.5.

The reaction of the $2^{nd}$ step may be carried out in solution, dispersion or preferably in the melt. If a solution process is carried out, the polymer to be grafted and the nitroxyl-terminated oligomer/polymer are preferably both soluble in the solvent. The solvent itself should be inert (low transmission rate) and the boiling point has to be high enough. Typical solvents for the modification of e.g. polyolefines or polyolefinic elastomers include xylene, decaline, tert-butylbenzene, chloro-/dichlorobenzene.

It is, however preferred, that the $2^{nd}$ step is carried out in the melt. The temperature applied in the second step is in general between 120° C. and 300° C. and must be such, that the thermoplastic or elastomeric polymer or copolymer can be processed or mixed in a typical polymer processing device such as a mixer, kneader or extruder. A preferred temperature range for the melt process is between 150° C. and 300° C., in particular between 150° C. and 280° C.

The reaction time for step B) depends on the reactivity of the macroinitiator and the desired amount of grafted polymer radicals. Typical reaction times are from a few minutes to hours. Preferably the reaction time is from 1 min to 1 h, most preferably from 2 min to 20 min.

When the macroinitiator is added to the thermoplastic or elastomeric polymer or copolymer no additional monomer has normally to be added. It is, however, possible for synthetic or technical reasons to add monomers or unfunctionalized homopolymers to achieve desired properties. If this is done, preferably low amounts are added.

When a melt process is carried out in step B), the temperature applied in the second reaction step B) depends on the polymer and is for example 50° to 150° C. above the glass transition temperature (Tg) for amorphous polymers and 20° to 180° C. above the melting temperature (Tm) for semi-crystalline polymers. Typical are following temperatures:

| low density polyethylene | LDPE | 170-260° C. |
| high density polyethylene | HDPE | 180-270° C. |
| polypropylene | PP | 180-280° C. |
| polystyrene | PS | 190-280° C. |
| styrene-block copolymers | SB(S) | 160-260° C. |
| ethylene-propylene-diene modified | EPDM | 160-260° C. |
| ethylene propylene rubber | EPR | 160-260° C. |

In a preferred process the temperature in the second step B) is from 170° C. to 280° C., more preferred from 190° C. to 280° C. The processing temperature shall be adjusted to achieve a homogeneous polymer melt and to avoid thermal degradation.

Step B) of the process may be performed in any reactor suitable for mixing a polymer melt. Preferably the reactor is an extruder, mixing or kneading apparatus as for example described in "Handbuch der Kunststoffextrusion" Vol. I, editor F. Hensen, W. Knappe and H. Potente, 1989, pages 3-7. If an extruder is used the process may be described as reactive extrusion process. Examples of reactive extrusion equipment and processes are given by G. H. Hu et al., in "Reactive Modifiers for Polymers", first edition, Blackie Academic & Professional an Imprint of Chapman & Hall, London 1997, chapter 1, pages 1-97.

The addition to the polymer can be effected in any customary mixing apparatus in which the polymer is melted and mixed with the additives. Suitable apparatus are known to those skilled in the art, such apparatus being predominantly mixers, kneaders and extruders.

The process is preferably carried out, by adding the compounds during processing in an extruder.

Especially preferred processing apparatus include single-screw extruders, double-screw extruders with screws rotating in the same or opposite directions, planetary roller extruders, ring extruders or co-kneaders. It is also possible to use processing machines which contain at least one degassing zone and which can be placed under reduced pressure to remove by-products or volatile residues.

Suitable extruders and kneaders are described inter alia in Handbuch der Kunststoff-extrusion, Vol. 1 Grundlagen, Eds. F. Hensen, W. Knappe, H Potente, 1989, pages 3-7, ISBN:3-446-14339-4 (Vol. 2 Extrusionsanlagen 1986, ISBN 3-446-14329-7).

By way of example, the screw length is 1-60 times the screw diameter and preferably 35-48 times the screw diameter. The screw speed is preferably 10-600 revolutions per minute (rev/min) and more especially 25-300 rev/min.

The maximum throughput is dependent upon the screw diameter, speed and driving power. The process of the present invention can also be carried out at lower than the maximum throughput by varying the mentioned parameters or by operating with feed weighing devices.

If a plurality of components is added, these can be added premixed or individually or in the form of a masterbatch or concentrate.

The mixtures are to be exposed to elevated temperature for a sufficient period of time for the desired grafting yield to occur. The temperature is above the softening temperature in the case of amorphous polymers or the melting temperature in the case of crystalline polymers. It is not always necessary that the grafting takes place to the maximum extent possible. Preferably at last 50% is grafted after the reaction step B.

Preferably, if an extruder is used, a reduced pressure of less than 200 mbar is applied during extrusion.

Preferably the nitroxyl terminated polymer or oligomer of step A) is added to the thermoplastic or elastomeric polymer or copolymer in an amount from 0.1% to 50% by weight, based on the weight of the thermoplastic or elastomeric polymer or copolymer.

Further aspects of the invention are a grafted thermoplastic or elastomeric polymer or copolymer obtained by the above process and the use of a nitroxyl terminated polymer or oligomer for the preparation of a grafted thermoplastic or elastomeric polymer or copolymer comprising heating mixing and reacting the nitroxyl terminated oligomer or polymer together with a thermoplastic or elastic polymer or copolymer at a temperature of between 120° C. and 300° C.

Radical generators such as peroxides/hydroperoxides, bisazo compounds or hydroxylamine-esters (as for example disclosed in WO 01/90113) can be further added in step B), in order to increase the radical concentration on the thermoplastic or elastomeric polymer or copolymer. The radical generator is selected according to its decomposition temperature and the intended reaction temperature. Suitable radical generators are for example, dicumylperoxide, 2,5-bis(tert-butylperoxy)-2,5-dimethyl-3-hexyne, di-tert-butylperoxide, 2,5-(bis(tert-butylperoxy)-2,5-dimethylhexane, tert-butyl-cumylperoxide, bis(tert-butylperoxyisopropyl)benzene, butyl-4,4-bis(tert-butylperoxy)valerate, tert-butyl hydroperoxide and the like.

There may be further additives added during step B) of the process, such as processing stabilizers, light or heat stabilizers, fillers pigments and the like.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxy-anilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl] propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1- methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenyl-amino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxy-phenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—$CH_2CH_2$—COO—$CH_2CH_2$$]_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2, 6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos®168, Ciba-Geigy), tris(nonylphenyl) phosphite,

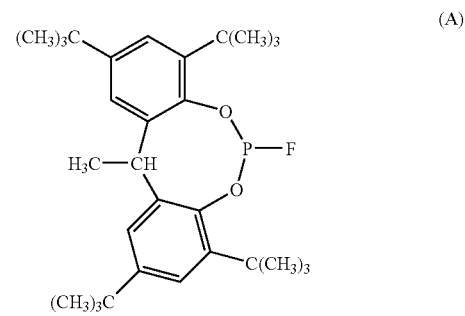

(A)

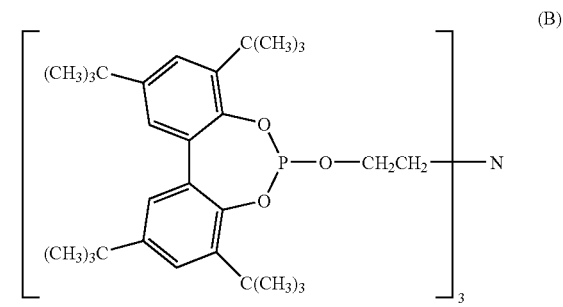

(B)

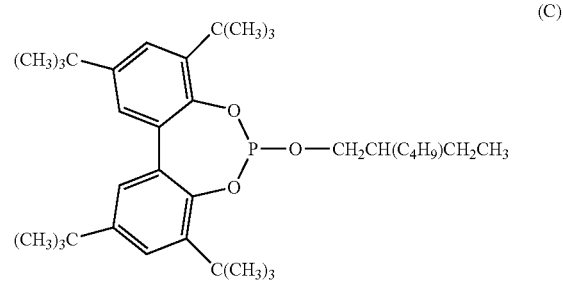

(C)

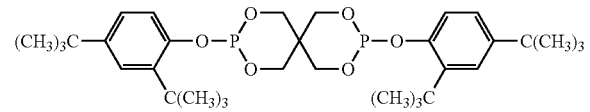

(D)

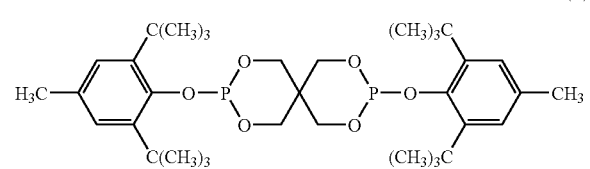

(E)

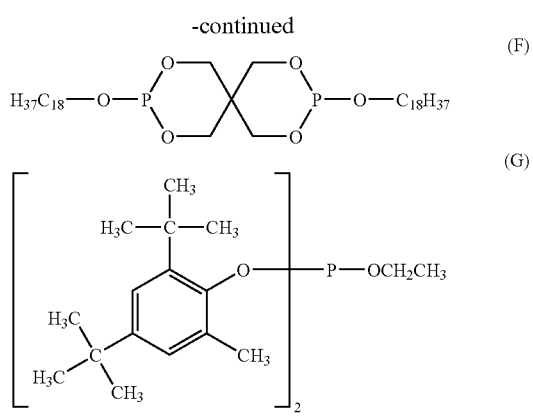

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The above mentioned radical generators and additives are for example present in step B) in an amount of 0.01 to 1% by weight based on the weight of the total polymer.

For instance step B is carried out in the presence of 0.01 to 0.5% of processing stabilizers/antioxidants.

The final comb or graft polymers are useful in many applications such as compatibilizers in polymer blends or alloys, adhesion promoters between two different substrates, surface modification agents, nucleating agents, coupling agents between filler and polymer matrix or dispersing agents, material for shaping parts or films.

The polymers prepared by the present invention are particularly useful for following applications:

adhesives, detergents, dispersants, emulsifiers, surfactants, defoamers, adhesion promoters, corrosion inhibitors, viscosity improvers, lubricants, rheology modifiers, thickeners, crosslinkers, paper treatment, water treatment, electronic materials, paints, coatings, photography, ink materials, imaging materials, superabsorbants, cosmetics, hair products, preservatives, biocide materials or modifiers for asphalt, leather, textiles, ceramics and wood.

The following examples illustrate the invention.

EXAMPLE A1

Grafting of NO-terminated Polystyrene (PS) onto Styrene-Butadiene-Styrene (SBS)

Synthesis of the macroinitiator 1: acetic acid 2,6-diethyl-2,3,6-trimethyl-1-piperidine-terminated-PS (according to step A, a1)

Styrene is distilled under reduced pressure prior to use. In a dry, argon-purged Schlenk tube, 1 mol % nitroxyl ether (compound 101) is dissolved in 45.45 g styrene. The solution is degassed in three consecutive freeze-thaw-cycles and then purged with argon. The stirred solution is then immersed in an oil bath and polymerized at 110° C. for 6 hours. After polymerization, residual monomer is removed under vacuum at 70° C. and the polymer is dried at 70° C. in vacuum until constant weight is achieved. Molecular weight is determined as described below ($M_n$=4200 g/mol).

Synthesis of the macroinitiator 2: acetic acid 2,6-diethyl-2,3,6-trimethyl-1-piperidine-terminated-PS (according to step A, a2)

Styrene is distilled under reduced pressure prior to use. In a dry, argon-purged Schlenk tube, 1 mol % of a nitroxyl radical (compound 102) and 0.77 mol % Benzoylperoxide (BPO) as initiator are dissolved in 45.45 g styrene. The solution is degassed in three consecutive freeze-thaw-cycles and then purged with argon. The stirred solution is then immersed in an oil bath and polymerized at 130° C. for 6 hours. After polymerization, residual monomer is removed under vacuum at 70° C. and the polymer is dried at 70° C. in vacuum until constant weight is achieved. Molecular weight is determined as described below ($M_n$=10400 g/mol).

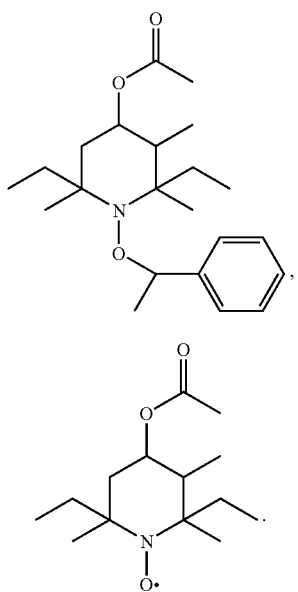

Compound 101

Compound 102

The compounds are prepared according to example 1 of GB 2 361 235.

Step B)

A mixture of 350 g SBS (Kraton D 1102 CU (Shell)) and 35 g (10%) NO-terminated-polystyrene as given in table 1 is extruded in a twin screw extruder (Haake TW 100) at 200° C. at 50 rpm and the resulting polymer is granulated. 10 g of the granulated polymer are dissolved in tetrahydrofurane (THF), precipitated in methanol and dried at 70° C. in vacuum until constant weight is achieved.

Molecular weight (step A and B) and molecular weight distribution are determined by size exclusion chromatography (SEC) on a HP 1090 liquid chromatograph (column PSS 1, lengths 60 cm, rate 1 ml/min, concentration 10 mg polymer in 1 ml THF; software: winGPC/Polymer Standard Services (PSS), Mainz, Germany) using THF as eluent and a column combination calibrated with narrow polystyrene standards (Polymer Laboratories). The polydispersity is calculated from $M_n$ (g/mol) and $M_w$ (g/mol) as PD=$M_w/M_n$. The results are shown in Table 1.

TABLE 1

Grafting of NO-terminated-PS onto SBS

| Example | NO-terminated PS | Mn [g/mol] | Increase of Mn [%] | PD |
|---|---|---|---|---|
| reference | None | 65530 | 0 | 1.3 |
| 1 | 10% macroinitiator 1 | 72320 | 10.4 | 1.3 |
| 2 | 10% macroinitiator 2 | 78290 | 19.5 | 1.2 |

Reference: SBS extruded, 200° C., 50 rpm

EXAMPLE A2

Grafting of NO-terminated Polystyrene (PS) onto Ethylene-Propylene-Diene Modified (EPDM)

Synthesis of macroinitiator 3: acetic acid 2,6-diethyl-2,3,6-trimethyl-1-piperidine-terminated-PS (according to example A1, step A)

Styrene is distilled under reduced pressure prior to use. In a dry, argon-purged Schlenk tube, 1 mol % nitroxyl ether (compound 101) is dissolved in 45.45 g styrene. The solution is degassed in three consecutive freeze-thaw-cycles and then purged with argon. The stirred solution is then immersed in an oil bath and polymerized at 130° C. for 6 hours. After polymerization, residual monomer is removed under vacuum at 70° C. and the polymer is dried at 70° C. in vacuum until constant weight is achieved. Molecular weight is determined as described in Example A1 ($M_n$=7300 g/mol)

Synthesis of macroinitiator 4: Acetic acid 2,6-diethyl-2,3,6-trimethyl-1-piperidine-terminated-PS (according to example A1, step A)

Styrene is distilled under reduced pressure prior to use. In a dry, argon-purged Schlenk tube, 0.1 mol % nitroxyl ether (NOR) is dissolved in 45.45 g styrene. The solution is degassed in three consecutive freeze-thaw-cycles and then purged with argon. The stirred solution is then immersed in an oil bath and polymerized at 130° C. for 6 hours. After polymerization, residual monomer is removed under vacuum at 70° C. and the polymer is dried at 70° C. in vacuum until constant weight is achieved. Molecular weight is determined as described in Example A1 (Mn=27000 g/mol).

Synthesis of macroinitiator 5: 2,2,6,6-Tetramethyl-4-propoxy-piperidine-terminated-PS (according to example A1, step A)

Styrene is distilled under reduced pressure prior to use. In a dry, argon-purged Schlenk tube, 1 mol % nitroxyl ether (compound 103) is dissolved in 45.45 g styrene. The solution is degassed in three consecutive freeze-thaw-cycles and then purged with argon. The stirred solution is then immersed in an oil bath and polymerized at 130° C. for 6 hours. After polymerization, residual monomer is removed under vacuum at 70° C. and the polymer is dried at 70° C. in vacuum until constant weight is achieved. Molecular weight is determined as described in Example A1 ($M_n$=8000 g/mol).

Compound 103

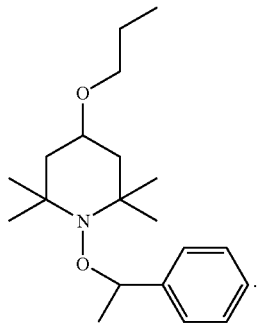

The compound is prepared in analogy to the preparation described in GB 2 361 235 from commercially available starting materials.

Step B)

350 g EPDM (Buna EP G 3850 (Bayer AG) is reacted together with 35 g (10%) NO-terminated-polystyrene as given in Table 2 in a kneader (Brabender W50, volume 55 cm³) at 200° C., 40 rpm and 10 min reaction time. 10 g of the resulting polymer were dissolved in 1,2-dichlorobenzene, precipitated in methanol and dried at 70° C. in vacuum until constant weight is achieved. The number average molecular weight and the molecular weight distribution are determined by high temperature gel-permeation-chromatography (HT-GPC) with a Waters 150C (5 PS columns of type μ-Styragel 500 Å+HT3+HT4+HT5+HT6, temperature 140° C., rate 1 ml/min, calibration with polystyrene standard supplied from Polymer Standard Services (PSS) using trichlorobenzene as eluent. The polydispersity is calculated from $M_n$ (g/mol) and $M_w$ (g/mol) as $PD=M_w/M_n$.

TABLE 2

Grafting of NO-terminated-PS onto EPDM

| Example | NO-terminated PS | Mn [g/mol] | PD |
|---|---|---|---|
| reference | none | 12600 | 17.6 |
| 1 | 10% macroinitiator 1 | 84600 | 2.1 |
| 2 | 10% macroinitiator 2 | 93980 | 2.2 |
| 3 | 10% macroinitiator 3 | 83300 | 2.4 | reference: EPDM after 10 min. in the kneader

EXAMPLE A3

Grafting of NO-terminated Poly-n-Butylacrylate (P-n-BuA) onto Ethylene-Propylene-Diene Modified (EPDM)

Synthesis of macroinitiator 6: acetic acid 2,6-diethyl-2,3,6-trimethyl-piperidine terminated P-n-BuA (according to example A1, step A)

n-Butylacrylate is distilled under reduced pressure prior to use. In a dry, argon-purged Schlenk tube, 1 mol % nitroxyl ether (compound 101) is dissolved in 55.9 g n-butylacrylate. The solution is degassed in three consecutive freeze-thaw-cycles and then purged with argon. The stirred solution is then immersed in an oil bath and polymerized at 110° C. for 6 hours. After polymerization, residual monomer is removed under vacuum at 30° C. and the polymer is dried at 30° C. in vacuum until constant weight is achieved. Molecular weight is determined as described in Example A1 ($M_n$=5800 g/mol).

Synthesis of macroinitiator 7: acetic acid 2,6-Diethyl-2,3,6-trimethyl-piperidine terminated P-n-BuA (according to example A1, step A)

n-butylacrylate is distilled under reduced pressure prior to use. In a dry, argon-purged Schlenk tube, 1 mol % nitroxyl ether (compound 101) is dissolved in 55.9 g n-butylacrylate. The solution is degassed in three consecutive freeze-thaw-cycles and then purged with argon. The stirred solution is then immersed in an oil bath and polymerized at 130° C. for 24 hours. After polymerization, residual monomer is removed under vacuum at 30° C. and the polymer is dried at 30° C. in vacuum until constant weight is achieved. Molecular weight is determined as described in Example A1 ($M_n$=10400 g/mol).

Step B)

350 g EPDM is reacted in the presence of 35 g (10%) NO-terminated-poly-n-butylacrylate (see table 3) in a kneader (Brabender W50, volume 55 cm³) at 200° C., 40 rpm and 10 min reaction time. 10 g of the resulting polymer were solved in 1,2-Dichlorobenzene, precipitated in Methanol and dried at 70° C. in vacuum until constant weight is achieved. The number average molecular weight and the molecular weight distribution are determined by high temperature gel-permeation-chromatography (HT-GPC) with a Waters 150C (5 PS columns of type μ-Styragel 500 Å+HT3+HT4+HT5+HT6, temperature 140° C., rate 1 ml/min, calibration with polystyrene standard supplied from Polymer Standard Services (PSS) using trichlorobenzene as eluent. The polydispersity is calculated from $M_n$ (g/mol) and $M_w$ (g/mol) as $PD=M_w/M_n$.

TABLE 3

Grafting of NO-term.-P-n-BuA onto EPDM

| Example | NO-terminated PS | Mn [g/mol] | PD |
|---|---|---|---|
| reference | none | 12600 | 17.6 |
| 1 | 10% macroinitiator 6 | 64300 | 3.1 |
| 2 | 10% macroinitiator 7 | 67000 | 2.6 | reference: EPDM after 10 min. in the kneader

EXAMPLE A4

Grafting of NO-terminated-SAN (styrene-co-acrylonitrile copolymer) onto Styrene-Butadiene-Styrene (SBS)

Synthesis of the macroinitiator 8: acetic acid 2,6-diethyl-2,3,6-trimethyl-1-piperidine-terminated-SAN (according to example A1, step A)

Styrene is distilled under reduced pressure prior to use and acrylonitrile is used undistilled. In a dry, argon-purged 1 l-autoclave, 1 mol % nitroxyl ether (compound 101) is dissolved in 375 g styrene and 125 g acrylonitrile. The solution is degassed and purged with argon. The stirred solution is polymerized at 110° C. for 6 hours. After polymerization, residual monomer is removed under vacuum at 70° C. and the polymer is dried at 70° C. in vacuum until constant weight is achieved. Molecular weight is determined as described in Example A1 ($M_n$=3800 g/mol).

Step B)

A mixture of 350 g SBS (Kraton D 1102 CU (Shell)) and 35 g (10%) NO-terminated-SAN as given in table 4 is extruded in a twin screw extruder (Haake TW 100, vented screw) at 200° C. (220° C.) at 50 rpm and the resulting polymer is granulated. 10 g of the granulated polymer are dissolved in tetrahydrofurane (THF), precipitated in methanol and dried at 70° C. in vacuum until constant weight is achieved.

Molecular weight and molecular weight distribution are determined by size exclusion chromatography (SEC) on a HP 1090 liquid chromatograph (column PSS 1, lengths 60 cm, rate 1 ml/min, concentration 10 mg polymer in 1 ml THF; software: winGPC/Polymer Standard Services (PSS), Mainz, Germany) using THF as eluent and a column combination calibrated with narrow polystyrene standards (Polymer Laboratories). The polydispersity is calculated from $M_n$ (g/mol) and $M_w$ (g/mol) as $PD=M_w/M_n$. The results are shown in Table 4.

TABLE 4

Grafting of NO-terminated-SAN onto SBS

| Example | NO-terminated SAN | Temp [° C.] | Mn [g/mol] | Increase of Mn [%] | PD |
|---|---|---|---|---|---|
| Reference 1 | None | 200 | 80000 | 0 | 1.2 |
| 1 | 10% macroinitiator 8 | 200 | 87500 | 9.4 | 1.3 |
| Reference 2 | None | 220 | 83430 | 0 | 1.3 |
| 2 | 10% macroinitiator 8 | 220 | 99230 | 18.9 | 1.9 |

Reference 1: SBS extruded, 200° C., 50 rpm
Reference 2: SBS extruded, 220° C., 50 rpm

EXAMPLE A5

Grafting of NO-terminated-SAN (styrene-co-acrylonitrile copolymer, higher molecular weight) onto Styrene-Butadiene-Styrene (SBS)

Synthesis of the macroinitiator 9: acetic acid 2,6-diethyl-2,3,6-trimethyl-1-piperidine-terminated-SAN (according to example A1, step A)

Styrene is distilled under reduced pressure prior to use and acrylonitrile is used undistilled. In a dry, argon-purged 2 l-autoclave, 0.1 mol % nitroxyl ether (compound 101) is dissolved in 1125 g styrene and 375 g acrylonitrile. The solution is degassed and purged with argon. The stirred solution is polymerized at 110° C. for 6 hours. After polymerization, residual monomer is removed under vacuum at 70° C. and the polymer is dried at 70° C. in vacuum until constant weight is achieved. Molecular weight is determined as described in Example A1 ($M_w$=29700 g/mol).

Step B)

A mixture of 350 g SBS (Kraton D 1102 CU (Shell)) and 35 g (10%) NO-terminated-SAN as given in table 5 is extruded in a twin screw extruder (Haake TW 100, compounding screw) at 200° C. (220° C.) at 50 rpm and the resulting polymer is granulated. 10 g of the granulated polymer are dissolved in tetrahydrofurane (THF), precipitated in methanol and dried at 70° C. in vacuum until constant weight is achieved.

Molecular weight and molecular weight distribution are determined by size exclusion chromatography (SEC) on a HP 1090 liquid chromatograph (column PSS 1, lengths 60 cm, rate 1 ml/min, concentration 10 mg polymer in 1 ml THF; software: winGPC/Polymer Standard Services (PSS), Mainz, Germany) using THF as eluent and a column combination calibrated with narrow polystyrene standards (Polymer Laboratories). The polydispersity is calculated from $M_n$ (g/mol) and $M_w$ (g/mol) as $PD=M_w/M_n$. The results are shown in Table 5.

TABLE 5

Grafting of NO-terminated-SAN onto SBS

| Example | NO-terminated SAN | Temp [° C.] | Mw [g/mol] | Increase of Mw [%] | PD |
|---|---|---|---|---|---|
| Reference 1 | None | 200 | 91530 | 0 | 1.2 |
| 1 | 10% macroinitiator 9 | 200 | 102600 | 12.1 | 1.7 |
| Reference 2 | None | 220 | 100700 | 0 | 1.2 |
| 2 | 10% macroinitiator 9 | 220 | 127600 | 26.7 | 1.8 |

Reference 1: SBS extruded, 200° C., 50 rpm
Reference 2: SBS extruded, 220° C., 50 rpm

EXAMPLE A6

Grafting of NO-terminated-SAN (styrene-co-acrylonitrile copolymer) onto Styrene-Butadiene-Styrene (SBS)

Synthesis of the macroinitiator 10: acetic acid 2,6-diethyl-2,3,6-trimethyl-1-piperidine-terminated-SAN (according to example A1, step A)

Styrene is distilled under reduced pressure prior to use and acrylonitrile is used undistilled. In a dry, argon-purged 2 l-autoclave, 1 mol % nitroxyl ether (compound 101) is dissolved in 1125 g styrene and 375 g acrylonitrile. The solution is degassed and purged with argon. The stirred solution is polymerized at 110° C. for 6 hours. After polymerization, residual monomer is removed under vacuum at 70° C. and the polymer is dried at 70° C. in vacuum until constant weight is achieved. Molecular weight is determined as described above ($M_n$=4270 g/mol; yield 41%).

Step B)

A mixture of 350 g SBS (Kraton D 1102 CU (Shell)), 35 g (10%) NO-terminated-SAN and eventually 0.6 g (0.2%) Irganox 1520 (as processing stabilizer) as given in table 6 is extruded in a twin screw extruder (Haake TW 100, vented screw) at 200° C. at 50 rpm and the resulting polymer is granulated. 10 g of the granulated polymer are dissolved in tetrahydrofurane (THF), precipitated in methanol and dried at 70° C. in vacuum until constant weight is achieved.

Molecular weight and molecular weight distribution are determined by size exclusion chromatography (SEC) on a HP 1090 liquid chromatograph (column PSS 1, lengths 60 cm, rate 1 ml/min, concentration 10 mg polymer in 1 ml THF; software: winGPC/Polymer Standard Services (PSS), Mainz, Germany) using THF as eluent and a column combination calibrated with narrow polystyrene standards (Polymer Laboratories). The polydispersity is calculated from $M_n$ (g/mol) and $M_w$ (g/mol) as $PD=M_w/M_n$. The results are shown in Table 6.

TABLE 6

Grafting of NO-terminated-SAN onto SBS

| Example | NO-terminated-SAN | Irganox 1520 | Mw [g/mol] | Increase of Mw [%] | PD | MFR |
|---|---|---|---|---|---|---|
| Reference | None | | 94000 | 0 | 1.2 | 0.87 |
| 1 | 10% macroinitiator 10 | | 100000 | 6.4 | 1.3 | 0.48 |
| 2 | 10% macroinitiator 10 | 0.2 | 100000 | 6.4 | 1.2 | 0.62 |

Reference: SBS extruded, 200° C., 50 rpm
MFR (melt flow rate): 190° C., 1.2 kg (according to ISO 1133)
Temperature for all extrusions: 200° C. (50 rpm)

Addition of an antioxidant, such as Irganox® 1520 avoids crosslinking of the elastomer.

The invention claimed is:

1. A process for the preparation of a grafted thermoplastic or elastomeric polymer or copolymer, which process comprises in a first step
   A) the preparation of a nitroxyl terminated oligomer or polymer by controlled free radical polymerization of an ethylenically unsaturated monomer or monomer mixture
      a1) in the presence of a nitroxyl ether containing a structural element of formula (Ia), wherein X is selected such, that cleavage of the O—X bond occurs and a radical X• is formed capable of initiating polymerization; or
      a2) in the presence of a nitroxyl radical containing a structural element of formula (Ib) and a free radical initiator capable of initiating polymerization;
   where unreacted monomer or monomers are removed and the nitroxyl terminated oligomer or polymer is isolated,
   and in a second step
   B) heating, mixing and reacting the nitroxyl terminated oligomer or polymer of step A) together with a thermoplastic or elastomeric polymer or copolymer at a temperature of between 150° C. and 300° C.,
   wherein the structural elements of formula (Ia) and (Ib) are

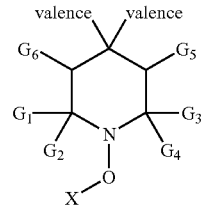

wherein $G_1$, $G_2$, $G_3$, $G_4$ are independently $C_1$-$C_6$alkyl or $G_1$ and $G_2$ or $G_3$ and $G_4$, or $G_1$ and $G_2$ and $G_3$ and $G_4$ together form a $C_5$-$C_{12}$cycloalkyl group; and $G_5$, $G_6$ independently are H, $C_1$-$C_{18}$alkyl, phenyl, naphthyl or a group $COOC_1$-$C_{18}$alkyl, where X is selected from the group consisting of

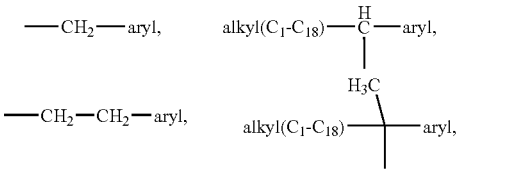

($C_5$-$C_6$cycloalkyl)$_2$CCN, ($C_1$-$C_{12}$alkyl)$_2$CCN, —CH$_2$CH═CH$_2$, ($C_1$-$C_{12}$)alkyl—CR$_{20}$—C(O)—($C_1$-$C_{12}$)alkyl, ($C_1$-$C_{12}$)alkyl—CR$_{20}$—C(O)—($C_6$-$C_{10}$)aryl, ($C_1$-$C_{12}$)alkyl—CR$_{20}$—C(O)—($C_1$-$C_{12}$)alkoxy, ($C_1$-$C_{12}$)alkyl—CR$_{20}$—C(O)—phenoxy, ($C_1$-$C_{12}$)alkyl—CR$_{20}$—C(O)—N—di($C_1$-$C_{12}$)alkyl, ($C_1$-$C_{12}$)alkyl—CR$_{20}$—CO—NH($C_1$-$C_{12}$)alkyl, ($C_1$-$C_{12}$)alkyl—CR$_{20}$—CO—NH$_2$, —CH$_2$CH═CH—CH$_3$, —CH$_2$—C(CH$_3$)═CH$_2$, —CH$_2$—CH═CH—phenyl, —CH$_2$—C(═CH$_2$)CH, 3-cyclohexenyl, 3-cyclopentenyl, and (tetrahydropyran-2-yl), (α-cyano-benzyl), (tetrahydrofuran-2-yl), wherein $R_{20}$ is hydrogen or $C_1$-$C_{12}$alkyl;

the alkyl groups are unsubstituted or substituted with one or more —OH, —COOH or —C(O)R$_{20}$ groups; and the aryl groups are phenyl or naphthyl which are unsubstituted or substituted with $C_1$-$C_{12}$alkyl, halogen, $C_1$-$C_{12}$alkoxy, $C_1$-$C_{12}$alkylcarbonyl, OH, —COOH or —COO($C_1$-$C_{12}$)alkyl and where the thermoplastic or elastomeric polymer or copolymer is selected from the group consisting of low density polyethylene, high density polyethylene, polyproylene, polystyrene, styrene-block copolymers, ethylene-propylene-diene modified rubber, ethylene propylene rubber, polybutylene, polyisobutylene and poly-4-methyl-pentene-1.

2. A process according to claim 1 wherein the nitroxyl ether or the nitroxyl radical is of formula A, A', B, B' O or O'

$$\left[ \begin{array}{c} X-O-N \underset{G_3 \ G_4 \ G_5}{\overset{G_1 \ G_2 \ G_6}{\bigcirc}} O-R \end{array} \right]_m \quad (A)$$

-continued

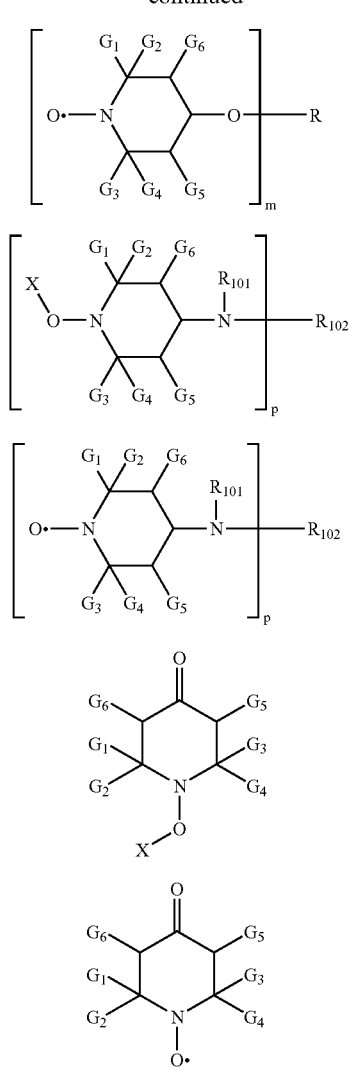

(A')

(B)

(B')

(O)

(O')

wherein
$G_1$, $G_2$, $G_3$ and $G_4$ are independently alkyl of 1 to 4 carbon atoms, or $G_1$ and $G_2$ together and $G_3$ and $G_4$ together, or $G_1$ and $G_2$ together or $G_3$ and $G_4$ together are pentamethylene;
$G_5$ and $G_6$ are independently hydrogen or $C_1$-$C_4$ alkyl;
m is 1, 2, 3 or 4
R, if m is 1, is hydrogen, $C_1$-$C_{18}$alkyl which is uninterrupted or $C_2$-$C_{18}$alkyl which is interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms, where each carboxylic acid can be substituted in the aliphatic, cycloaliphatic or aromatic moiety by 1 to 3 —$COOZ_{12}$ groups, in which $Z_{12}$ is H, $C_1$-$C_{20}$alkyl, $C_3$-$C_{12}$alkenyl, $C_5$-$C_7$cycloalkyl, phenyl or benzyl; or
R is a monovalent radical of a carbamic acid or phosphorus-containing acid or a monovalent silyl radical;
R, if m is 2, is $C_2$-$C_{12}$alkylene, $C_4$-$C_{12}$alkenylene, xylylene, a divalent radical of an aliphatic dicarboxylic acid having 2 to 36 carbon atoms, or a cycloaliphatic or aromatic dicarboxylic acid having 8-14 carbon atoms or of an aliphatic, cycloaliphatic or aromatic dicarbamic acid having 8-14 carbon atoms, where each dicarboxylic acid may be substituted in the aliphatic, cycloaliphatic or aromatic moiety by one or two —$COOZ_{12}$ groups; or
R is a divalent radical of a phosphorus-containing acid or a divalent silyl radical;
R, if m is 3, is a trivalent radical of an aliphatic, cycloaliphatic or aromatic tricarboxylic acid, which may be substituted in the aliphatic, cycloaliphatic or aromatic moiety by —$COOZ_{12}$, of an aromatic tricarbamic acid or of a phosphorus-containing acid, or is a trivalent silyl radical,
R, if m is 4, is a tetravalent radical of an aliphatic, cycloaliphatic or aromatic tetracarboxylic acid;
p is 1, 2 or 3,
$R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;
when p is 1,
$R_2$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$—Z or of the formula —CO—Z— or —CONH—Z wherein Z is hydrogen, methyl or phenyl; or
when p is 2,
$R_2$ is $C_2$-$C_{12}$alkylene, $C_6$-$C_{12}$-arylene, xylylene, a —$CH_2CH(OH)CH_2$—O—B—O—$CH_2CH(OH)CH_2$— group, wherein B is $C_2$-$C_{10}$alkylene, $C_6$-$C_{15}$arylene or $C_6$-$C_{12}$cycloalkylene; or, provided that $R_1$ is not alkanoyl, alkenoyl or benzoyl, $R_2$ can also be a divalent acyl radical of an aliphatic, cycloaliphatic or aromatic dicarboxylic acid or dicarbamic acid, or can be the group —CO—; or $R_1$ and $R_2$ together when p is 1 can be the cyclic acyl radical of an aliphatic or aromatic 1,2- or 1,3-dicarboxylic acid; or
$R_2$ is a group

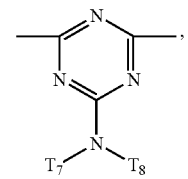

where $T_7$ and $T_8$ are independently hydrogen, alkyl of 1 to 18 carbon atoms, or $T_7$ and $T_8$ together are alkylene of 4 to 6 carbon atoms or 3-oxapentamethylene;
when p is 3,
$R_2$ is 2,4,6-triazinyl; and
X is selected from the group consisting of

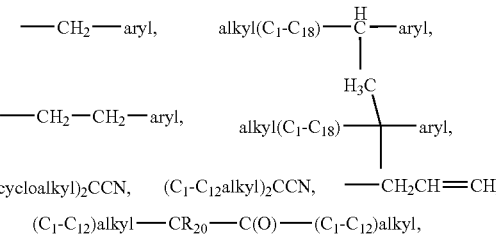

-continued $(C_1-C_{12})alkyl—CR_{20}—C(O)—(C_6-C_{10})aryl,$ $(C_1-C_{12})alkyl—CR_{20}—C(O)—(C_1-C_{12})alkoxy,$ $(C_1-C_{12})alkyl—CR_{20}—C(O)—phenoxy,$ $(C_1-C_{12})alkyl—CR_{20}—C(O)—N—di(C_1-C_{12})alkyl,$ $(C_1-C_{12})alkyl—CR_{20}—CO—NH(C_1-C_{12})alkyl,$ $(C_1-C_{12})alkyl—CR_{20}—CO—NH_2,$ —$CH_2CH=CH—CH_3,$ —$CH_2—C(CH_3)=CH_2,$ —$CH_2—CH=CH—phenyl,$

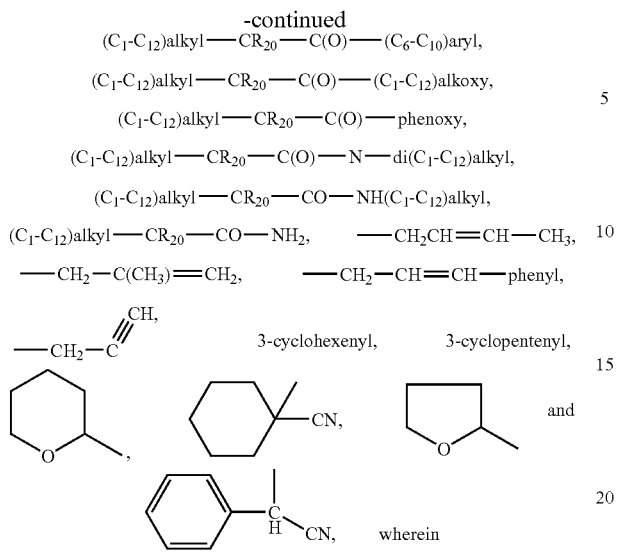

wherein $R_{20}$ is hydrogen or $C_1$-$C_{12}$alkyl;

the alkyl groups are unsubstituted or substituted with one or more —OH, —COOH or —C(O)$R_{20}$ groups; and the aryl groups are phenyl or naphthyl which are unsubstituted or substituted with $C_1$-$C_{12}$alkyl, halogen, $C_1$-$C_{12}$alkoxy, $C_1$-$C_{12}$alkylcarbonyl, OH, —COOH or —COO($C_1$-$C_{12}$)alkyl.

3. A process according to claim 2 wherein the nitroxyl ether or the nitroxyl radical is of formula A, A', B, B', O or O'

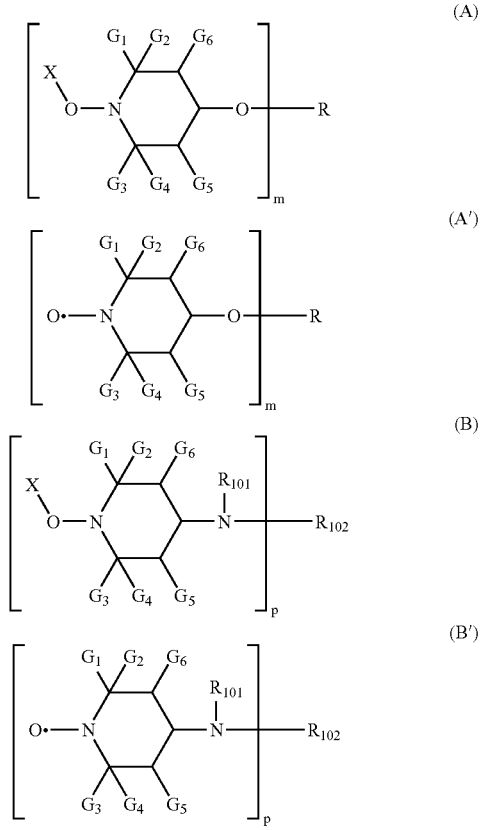

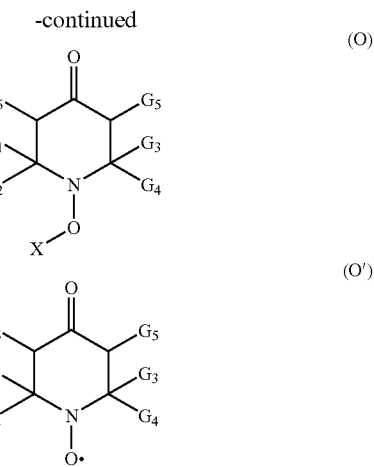

wherein m is 1,

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$—Z or of the formula —CO—Z or —CONH—Z wherein Z is hydrogen, methyl or phenyl;

$G_6$ is hydrogen and $G_5$ is hydrogen or $C_1$-$C_4$alkyl, $G_1$, $G_2$, $G_3$ and $G_4$ are methyl; or $G_1$ and $G_3$ are methyl and $G_2$ and $G_4$ are ethyl or propyl or $G_1$ and $G_2$ are methyl and $G_3$ and $G_4$ are ethyl or propyl; and X is selected from the group consisting of —$CH_2$-phenyl, $CH_3CH$-phenyl, $(CH_3)_2C$-phenyl, ($C_5$-$C_6$cycloalkyl)$_2$CCN, $(CH_3)_2CCN$, —$CH_2CH=CH_2$, $CH_3CH—CH=CH_2$ ($C_1$-$C_4$alkyl)$CR_{20}$—C(O)-phenyl, ($C_1$-$C_4$)alkyl-$CR_{20}$—C(O)—($C_1$-$C_4$)alkoxy, ($C_1$-$C_4$alkyl-$CR_{20}$—C(O)—($C_1$-$C_4$)alkyl, ($C_1$-$C_4$alkyl-$CR_{20}$—C(O)—N-di($C_1$-$C_4$alkyl, ($C_1$-$C_4$alkyl-$CR_{20}$—C(O)—NH($C_1$-$C_4$)alkyl and ($C_1$-$C_4$)alkyl-$CR_{20}$—C(O)—$NH_2$, wherein $R_{20}$ is hydrogen or ($C_1$-$C_4$)alkyl.

4. A process according to claim 2 wherein $G_2$ and $G_4$ are ethyl, $G_1$ and $G_3$ are methyl, $G_6$ is hydrogen and $G_5$ is methyl.

5. A process according to claim 1 wherein the free radical initiator of component a2) is a bis-azo compound, a peroxide, a perester or a hydroperoxide.

6. A process according to claim 1, wherein the nitroxylether of component a1) or the nitroxyl radical of component a2) is present in an amount of from 0.001 mol-% to 20 mol-%, based on the monomer or monomer mixture.

7. A process according to claim 1, wherein the free radical initiator is present in an amount of from 0.001 mol-% to 20 mol-%, based on the monomer or monomer mixture.

8. A process according to claim 1, wherein the ethylenically unsaturated monomer is selected from the group consisting of styrene, substituted styrene, conjugated dienes, vinyl acetate, vinylpyrrolidone, vinylimidazole, maleic anhydride, (alkyl)acrylic acidanhydrides, (alkyl)acrylic acid salts, (alkyl)acrylic esters, (meth)acrylonitriles, (alkyl)acrylamides, vinyl halides and vinylidene halides.

9. A process according to claim 7, wherein the ethylenically unsaturated monomer is a compound of formula $CH_2=C(R_a)-(C=Z)-R_b$, wherein $R_a$ is hydrogen or $C_1$-$C_4$alkyl, $R_b$ is $NH_2$, $O^-(Me^+)$, glycidyl, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, hydroxy-substituted $C_1$-$C_{18}$alkylamino or hydroxy-substituted di($C_1$-$C_{18}$alkyl)amino, $-O-CH_2-CH_2-N(CH_3)_2$ or $-O-CH_2-CH_2-N^+H(CH_3)_2An^-$;

An$^-$ is a anion of a monovalent organic or inorganic acid;

Me is a monovalent metal atom or the ammonium ion and

Z is oxygen or sulfur.

10. A process according to claim 1 wherein step B) is performed in an extruder, mixer or kneading apparatus.

11. A process according to claim 1 wherein in step B) additionally a processing stabilizer and/or antioxidant is added.

12. A process according to claim 1 wherein in step B) additionally a radical generator is added.

13. A process according to claim 1 wherein the nitroxyl terminated polymer or oligomer of step A) has a number average molecular weight of from 1000 to 100 000 Dalton.

14. A process according to claim 1 wherein the nitroxyl terminated polymer or oligomer of step A) has a polydispersity (PD) from 1.0 to 2.0.

15. A process according to claim 1 wherein the nitroxyl terminated polymer or oligomer of step A) is added to the thermoplastic or elastomeric polymer or copolymer in an amount from 0.1% to 50% by weight based on the weight of the thermoplastic or elastomeric polymer or copolymer.

* * * * *